J. KOSTEWICH.
SLED BICYCLE.
APPLICATION FILED MAR. 30, 1918.

1,281,980.

Patented Oct. 15, 1918.

Inventor
J. Kostewich
By Victor J. Evans
Attorney

Witness
E. R. Ruppirt
J. Wilcox

UNITED STATES PATENT OFFICE.

JOSEPH KOSTEWICH, OF NEWPORT, NEW HAMPSHIRE.

SLED-BICYCLE.

1,281,980.

Specification of Letters Patent.  Patented Oct. 15, 1918.

Application filed March 30, 1918. Serial No. 225,770.

*To all whom it may concern:*

Be it known that I, JOSEPH KOSTEWICH, a citizen of Russia, residing at Newport, in the county of Sullivan and State of New Hampshire, have invented new and useful Improvements in Sled-Bicycles, of which the following is a specification.

This invention relates to sled bicycles and it consists in the novel features hereinafter described and claimed.

An object of the invention is to provide an attachment of simple and durable structure adapted to be applied to the frame of an ordinary bicycle for the purpose of transforming the same from a land traveling vehicle to a vehicle adapted to be propelled over the surface of ice or snow.

With this object in view the invention consists in providing a supporting means adapted to be applied to the fork of the bicycle in substitution of the front wheel thereof. The device also includes appliances for application to the rear portion of the frame of the bicycle, the said appliances including means for supporting the rear part of the frame and means connected with the rear axle of the bicycle and adapted to be used for propelling the frame.

Figure 1:
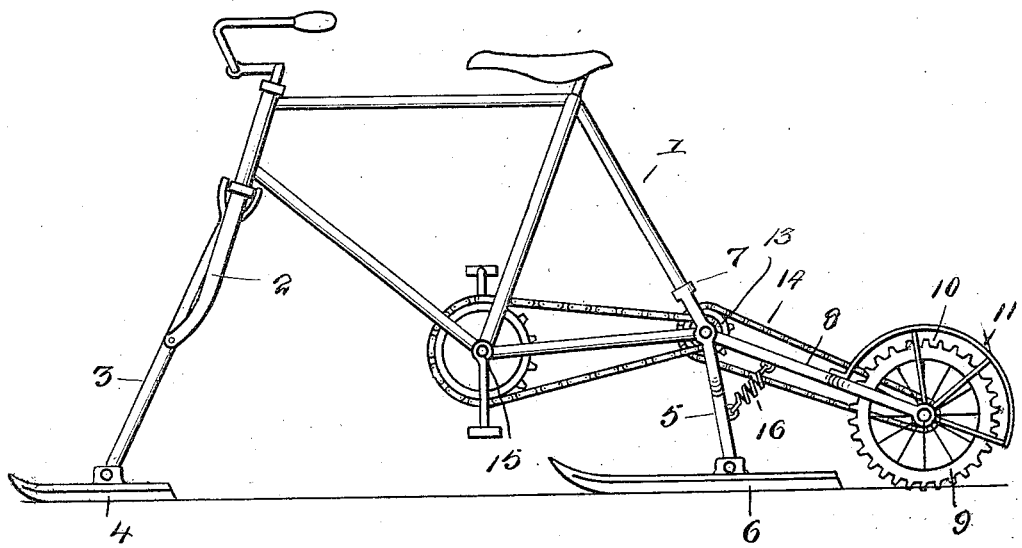
Figure 1 is a side elevation of a bicycle frame with the attachment applied.
Figure 2:
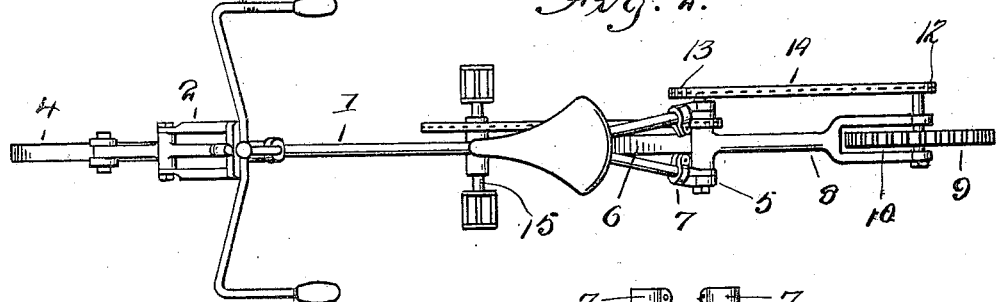
Fig. 2 is a top plan view of the same with parts removed.
Figure 3:
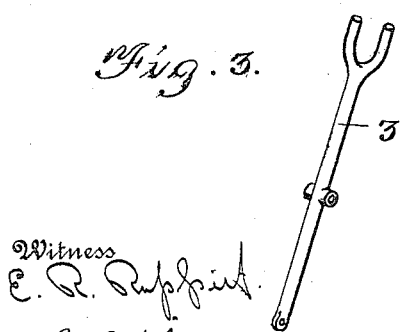
Fig. 3 is a perspective view of an arm used in the attachment.
Figure 4:
Fig. 4 is a side elevation of a standard used in the attachment.

The bicycle frame 1 is of usual pattern and the fork 2 is pivoted at the front end thereof in a usual manner. The support for the forward end of the frame 1 comprises an arm 3 which is attached to the lower portion of the fork 2 and which carries at its lower end a runner 4 adapted to travel upon the surface of the ice or snow.

A standard 5 is fixed to the axle at the rear portion of the frame 1 and a runner 6 is pivotally attached to the lower end of the said standard and is adapted to travel upon the surface of the ice or snow. The upper portion of the standard 5 may be secured with relation to the rear part of the frame 1 by means of suitable clips 7. An arm 8 is pivotally connected at its forward end with the rear axle of the frame 1 and the rear portion of the said arm 8 extends rearwardly and downwardly. A wheel 9 is journaled at the rear end of the arm 8 and carries upon its periphery a series of pointed teeth 10. A shield 11 is attached to the rear portion of the arm 8 and extends over the upper portion of the wheel 9. A sprocket wheel 12 is fixed to the axle of the wheel 9 and a sprocket wheel 13 is fixed to the rear axle of the frame 1. A chain 14 is trained around the sprocket wheels 12 and 13 and is adapted to transmit rotary movement from the rear axle of the frame 1 to the wheel 9. The rear axle of the frame 1 is operatively connected with the crank or pedal shaft 15 of the bicycle in a usual manner. A spring 16 is connected at one end with the standard 5 and at its other end with the arm 8 and is under tension with a tendency to resiliently hold the lower part of the periphery of the wheel 9 in contact with the surface of the ice or snow.

Consequently it will be seen that when the shaft 15 is rotated rotary movement is transmitted by the connecting parts to the wheel 9 which is in contact with the surface of the ice or snow. Therefore the frame 1 is propelled over the ice or snow and by turning the fork 2 in a usual manner the frame may be directed or steered.

Having described the invention what is claimed is:

In combination with a bicycle frame, means for supporting the forward portion thereof, a standard fixed to the frame, a runner pivoted at the lower end of said standard, an arm pivoted to the rear axle of the frame for movement with relation to the standard, a spring connecting the arm with the standard, a dentate wheel carried by the arm and means for rotating said wheel from the rear axle.

In testimony whereof I affix my signature

JOSEPH KOSTEWICH.